US008644299B2

(12) United States Patent
Parolkar et al.

(10) Patent No.: US 8,644,299 B2
(45) Date of Patent: Feb. 4, 2014

(54) METHOD AND APPARATUS FOR EFFICIENTLY ROUTING PACKETS ACROSS DISPARATE NETWORKS

(75) Inventors: Satish Parolkar, Austin, TX (US);
Robert F. Dailey, Austin, TX (US);
Arshad Khan, Austin, TX (US);
Chaoxin Qiu, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 917 days.

(21) Appl. No.: 12/630,660

(22) Filed: Dec. 3, 2009

(65) Prior Publication Data

US 2011/0134907 A1 Jun. 9, 2011

(51) Int. Cl.
*H04L 12/66* (2006.01)
*H04L 12/28* (2006.01)
*H04L 12/56* (2006.01)

(52) U.S. Cl.
USPC .......................... 370/352; 370/392; 370/401

(58) Field of Classification Search
None
See application file for complete search history.

(56) References Cited

U.S. PATENT DOCUMENTS

| | | | | |
|---|---|---|---|---|
| 7,760,744 | B1 * | 7/2010 | Mohaban | 370/401 |
| 2006/0146792 | A1 * | 7/2006 | Ramachandran et al. | 370/352 |
| 2007/0019563 | A1 * | 1/2007 | Ramachandran et al. | 370/252 |
| 2007/0019625 | A1 * | 1/2007 | Ramachandran et al. | 370/352 |
| 2007/0140223 | A1 * | 6/2007 | Bhatia et al. | 370/352 |
| 2008/0037430 | A1 * | 2/2008 | Wah et al. | 370/241 |
| 2008/0037533 | A1 * | 2/2008 | Wah et al. | 370/389 |
| 2008/0186985 | A1 * | 8/2008 | Sheth et al. | 370/401 |
| 2008/0219265 | A1 * | 9/2008 | Fieremans et al. | 370/392 |
| 2008/0291901 | A1 * | 11/2008 | Stratton et al. | 370/352 |
| 2009/0201911 | A1 * | 8/2009 | Dupertuis et al. | 370/352 |
| 2009/0274150 | A1 * | 11/2009 | Biswas et al. | 370/389 |
| 2009/0279537 | A1 * | 11/2009 | Strickland et al. | 370/352 |
| 2010/0239077 | A1 * | 9/2010 | Michaelis et al. | 379/93.02 |
| 2010/0284399 | A1 * | 11/2010 | Mohaban | 370/352 |
| 2010/0309906 | A1 * | 12/2010 | Ramachandran et al. | 370/352 |
| 2011/0058544 | A1 * | 3/2011 | Sardesai et al. | 370/352 |
| 2012/0127989 | A1 * | 5/2012 | Sheth et al. | 370/352 |

* cited by examiner

*Primary Examiner* — Suk Jin Kang

(57) ABSTRACT

A method, a system and a computer readable medium for routing packets across disparate networks are disclosed. For example, the method receives, via a media gateway controller (MGC), an external request from an external requestor for a reservation of a public switched telephone network (PSTN) trunk on a media gateway (MGW) for a communication session between a voice over Internet protocol (VoIP) network and a PSTN network, sends, via the MGC, a H.248 request to the MGW to make the reservation, establishes via the MGW, a communication path and sending a message to the MGC, retrieves, via the MGC, an assigned Internet protocol (IP) address and IP port on the MGW from the message from the MGW, sends, via the MGC, an allocation request to a media terminating session border controller (SBC) and allocates, via the media terminating SBC, a public IP address and a public IP port from an available pool of IP addresses and IP ports at the media terminating SBC.

20 Claims, 3 Drawing Sheets

METHOD AND APPARATUS FOR EFFICIENTLY ROUTING PACKETS ACROSS DISPARATE NETWORKS

BACKGROUND

In a typical service provider network there are a large number of Session Border Controllers (SBCs) protecting its network elements across a large geographically dispersed service area. When two endpoints are on different or disparate networks, a registering SBC remains on the signaling path and the media path of the call. This creates "hairpinning" of calls as the media path is required to traverse through a single network two or more times. For example, a "hairpin" results when a media path traverses a network once to get to the registering SBC and then traverses the same network a second time to get to the endpoint. "Hairpinning" creates inefficient use of network resources such as bandwidth, processing power and memory of network elements.

SUMMARY

In one embodiment, the present disclosure teaches a method, a system and a computer readable medium for routing packets across disparate networks. For example, the method receives, via a media gateway controller (MGC), an external request from an external requestor for a reservation of a public switched telephone network (PSTN) trunk on a media gateway (MGW) for a communication session between a voice over Internet protocol (VoIP) network and a PSTN network, sends, via the MGC, a H.248 request to the MGW to make the reservation, establishes via the MGW, a communication path and sending a message to the MGC, retrieves, via the MGC, an assigned Internet protocol (IP) address and IP port on the MGW from the message from the MGW, sends, via the MGC, an allocation request to a media terminating session border controller (SBC) and allocates, via the media terminating SBC, a public IP address and a public IP port from an available pool of IP addresses and IP ports at the media terminating SBC.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, a computer readable medium and an apparatus for efficiently routing packets across disparate networks. In one embodiment, the packets may be real-time transport protocol (RTP) packets and the networks may be internet protocol (IP) based networks. Although the present disclosure is discussed below in the context of IP networks, the present disclosure is not so limited. Namely, the present disclosure can be applied to packet networks in general, e.g., Voice over Internet Protocol (VoIP) networks, Service over Internet Protocol (SoIP) networks, wireless networks, and the like.

Figure 1:
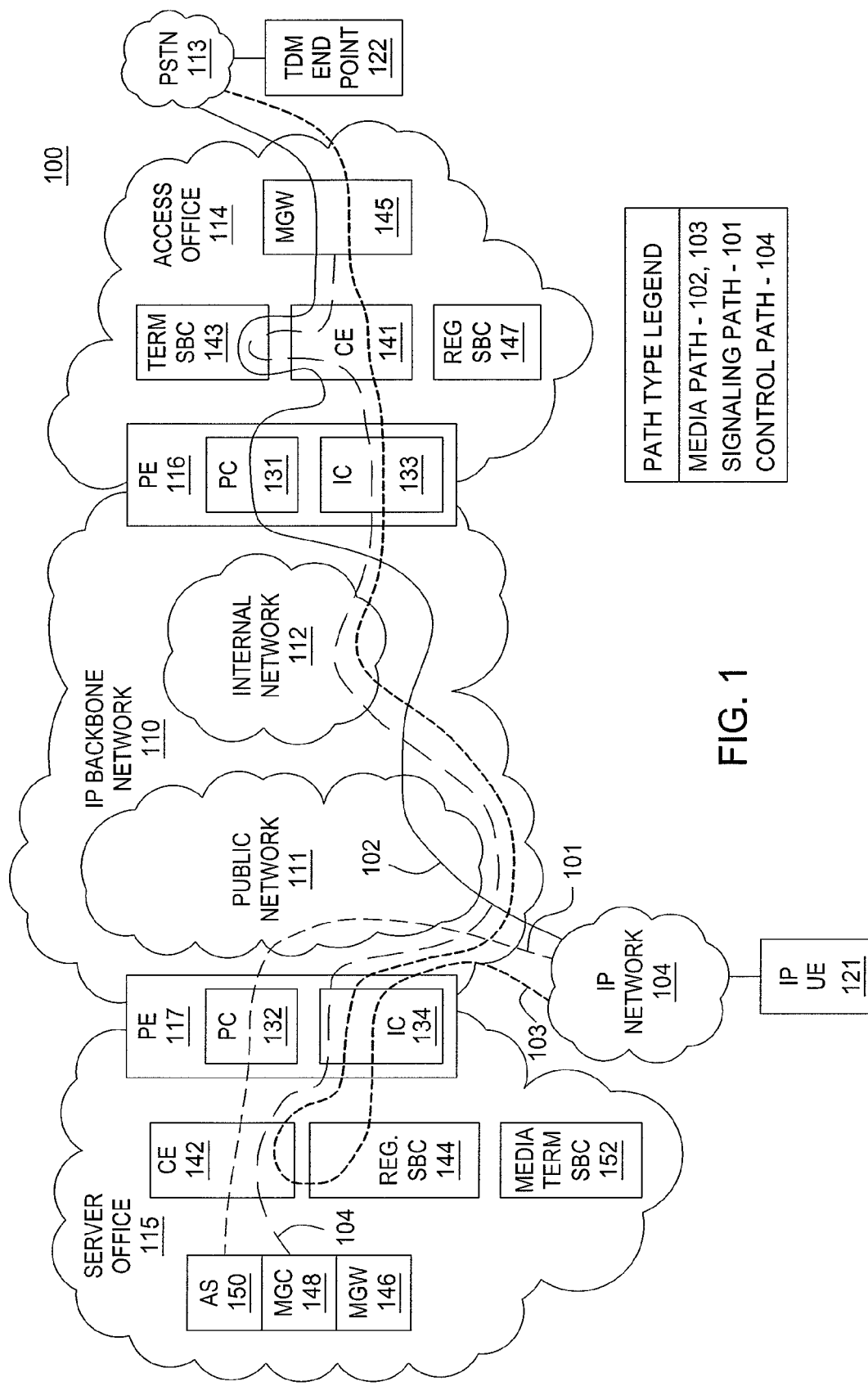
FIG. 1 illustrates an exemplary network related to the present disclosure.

FIG. 1 illustrates an exemplary network 100 related to the current disclosure. The exemplary network 100 may be used to support calls between disparate or different networks. For example the disparate networks may be an IP network 104 for supporting IP based endpoint devices that use an untrusted network to access services and a Public Switched Telephone Network (PSTN) network 113 for supporting Time Division Multiplexing (TDM) based customer endpoint devices that use a trusted network to access service. The exemplary network 100 comprises IP based User Endpoint (UE) 121 connected to an access network or IP network 104 to access services, e.g., VoIP services and a TDM endpoint 122 connected to the PSTN network 113 to access voice services.

As noted above, in one embodiment the IP UE 121 accesses services through an untrusted network or a public network such as the Internet. In one embodiment, the TDM endpoint 122 accesses services through a trusted network or a private network such as a Multiprotocol Label Switch (MPLS) Virtual Private Network (VPN). Although only one UE 121 and one TDM endpoint 122 is illustrated, it should be noted that any number of UEs 121 and TDM endpoints 122 may be included.

In one embodiment, the network 100 may be used to support a call between the IP based UE 121 and the TDM endpoint 122. In one illustrative example, the network 100 may comprise a regional access office 114 and a regional server office 115 that are connected to an IP backbone network 110. The IP backbone network 110 comprises a public network 111 and an internal network 112. Network addresses (e.g., router addresses) within the internal network 112 are reachable using routing information available only within the service provider's network. The public network 111 comprises the network portion reachable using routing information (e.g., IP addresses) available in the public domain.

The IP backbone network 110 also comprises Provider Edge (PE) routers 116 and 117. The PE routers 116 and 117 can provide routing for both the public and internal networks 111 and 112. Specifically, PE router 116 is logically segmented into a portion for public connections 131 and a portion for internal connections 133. Similarly, PE router 117 is logically segmented into a portion for public connections 132 and a portion for internal connections 134. The portion for public connections and the portion for internal connections may also be referred to as simply public connections and internal connections.

Regional access office 114 and regional server office 115 are used for hosting network devices such as Session Border Controllers (SBC), Media Gateways (MGWs), Media Gateway Controllers (MGC), Customer Edge (CE) routers, Application Servers (AS), etc. in a distributed manner. Note that an access office or a server office may host any number of MGWs, any number of SBCs, and so on. In addition, the number and type of devices hosted at each access office may be different.

In addition, the regional access office 114 and the regional server office 115 may be symmetric or mirror images of one another in many respects. In other words, the regional access office 114 and the regional server office 115 may contain the same equipment except for the fact that the regional server office 115 may contain an AS 150 and a MGC 148. As a result, the regional access office 114 and the regional server office 115 may support calls in either direction, i.e. from IP to PSTN or PSTN to IP, using the methodology of the present disclosure.

In one embodiment, the regional office 114 and regional server office 115 represent disparate or different networks that are geographically remote. For example, regional office 114 may be located in a first city and the regional server office 115 may be located remotely away in a second city.

In one embodiment, the SBCs are used to enable IP UEs to connect to the network 100 and obtain services. For example, a UE may register at a particular SBC to receive VoIP services. Each SBC bridges between the public network 111 and the internal network 112. Once a UE registers at a particular SBC, signaling messages to/from the UE flow through the particular SBC at which the UE is registered. The particular SBC performs the bridging of the call between the public and internal networks.

The MGWs are used to support calls between IP based UEs and TDM based PSTN endpoints. Calls to or from a PSTN endpoint use a particular trunk group on a particular MGW, depending on the PSTN number. The PSTN number refers to a phone number. For example, in phone numbers derived from the North American Numbering Plan (NANP), the phone number is a 10 digit number. The area code is the first three digits, and is also referred to as a Number Plan Area (NPA) code. The term NPA.NXX refers to the first six digits of a phone number containing the NPA code and a three digit exchange number following the area code. Calls to and from a particular NPA.NXX may then use a particular trunk group on a particular MGW. For example, MGW 145 may handle calls to/from the TDM endpoint 122.

In one embodiment, the MGC is used to control the MGWs. For example, the MGCs may receive signaling information from the MGW and instruct the MGWs to alert the called party and/or to send and receive voice data.

In one embodiment, the AS 150 may be used to execute various applications needed by the server office 115. For example, the AS 150 may store a table that correlates which MGW serves the called party. For example, the table may provide which MGW is associated with a dialed number. This information may be passed to the MGC for call signaling.

In network 100, regional access office 114 hosts CE router 141, a media terminating SBC 143, a MGW 145 and a registering SBC 147. Similarly, regional server office 115 hosts a CE router 142, a registering SBC 144, a MGW 146, a MGC 148, a media terminating SBC 152 and an AS 150. The regional access office 114 and the regional server office 115 are connected to the IP backbone network 110 via a PE router, e.g., PE 116 or 117, over both public and internal connections. Namely, CE router 141 is connected to public connections 131 on PE router 116 over a public link, e.g., over the Internet. CE router 141 is also connected to internal connections 133 on PE router 116 over an internal link, e.g., an internal local area network. Similarly, CE router 142 is connected to public connections 132 and internal connections 134 on PE router 117.

Packets from IP UE 121 reach the server office 115 via the public network 111 and a public connection 132 on PE 117. For example, UE 121 may register at the registering SBC 144 in the server office 115. Packets from UE 121 may then reach the registering SBC 144 in the server office 115 via the public network 111, the public connections 132 located in PE 117 and CE 142.

If a call is between an IP based UE and a TDM based PSTN phone, then the call is handled by the SBC at which the UE is registered and the MGW handling calls to/from the PSTN phones for the specific area code, i.e., NPA code. If the SBC and the MGW for a call are collocated in the same access office, then the call traverses the link between the PE router and the CE router once.

However, if the SBC and the MGW for a call are located in different offices (e.g. server office 115 of IP UE 121 and access office 114 of TDM endpoint 122), then the call traverses the link between the PE router and CE router in the server office with the registering SBC twice. This is referred to as "hairpinning" and illustrated by line 103 in FIG. 1. As discussed above, "hairpinning" creates a problem in that it results in inefficient use of resources of network elements within the network 100. The present disclosure provides methods and systems for resolving the "hairpinning" issue represented by line 103 in FIG. 1.

In one example, a call is originated by UE 121 registered at SBC 144. The call is destined to the TDM endpoint 122 and MGW 145 handles the area code (NPA) for the TDM endpoint 122. Initially, UE 121 sends a signaling message in a first protocol (e.g., a session initiated protocol (SIP)) to the AS 150. The AS 150 determines which MGW services the TDM endpoint 122 and passes this information to the MGC 148. The MGC sends a control message in a second protocol (e.g. H.248) to the MGW 145. The signaling path is illustrated by dashed lines 101 and the control path is illustrated by line 104 in FIG. 1.

Before implementation of the present disclosure, a media path (e.g., using a real-time transport protocol (RTP)) would be established between the registering SBC 144 and the MGW 145 to connect the call between the IP UE 121 and the TDM endpoint 122. As a result, "hairpinning" of the media path would occur as illustrated by line 103 and noted above.

The line 103 illustrates the media path traversed by packets to/from UE 121 from/to TDM endpoint 122. The call originated by UE 121 traverses PE 117 to reach SBC 144, then through CE 142 and then back through PE 117 to reach the MGW 145. SBC 144 bridges the call to the internal network 112 and forwards it to MGW 145 via CE 141. The MGW 145 may then forward the call to the TDM endpoint 122 via the PSTN 113.

As illustrated in the above example, when the SBC and MGW for a call are in different regional offices (i.e. not collocated), twice as much bandwidth is required in the server office with the SBC, as compared to the bandwidth required when the SBC and MGW are collocated.

However, to address the issue of "hairpinning" represented by line 103 in FIG. 1 that occurs when calls traverse an SBC and an MGW in different access offices and server offices, the present disclosure provides a media terminating SBC 143 collocated with the MGW 145 serving the TDM endpoint 122. The media terminating SBC 143 prevents the "hairpinning" of calls.

The media terminating SBC 143 can modify an allocated IP port and IP address offered by the MGW 145 to the MGC 148 with a new public IP port and a new public IP address for delivery to an external requestor (e.g. a calling party). For example, after the MGW 145 assigns a port and an IP address to transmit back to the registering SBC 144, the media terminating SBC 143 re-assigns a new port and a new IP address to create a modified call signal. The new IP port and the new IP address enable and ensure communications between the MGC 148 and the MGW 145 through the new IP port and the new IP address. The new port and the new IP address are public ports and IP addresses that may be reached via the public network 111 (e.g. the Internet).

As a result, when the modified call signal is passed back to a calling party (e.g., the IP UE 121) via the registering SBC 144, the calling party (e.g., IP UE 121) may use the publicly available new port and new IP address to directly connect to the media terminating SBC 143 via the public network 111. In other words, a media path (e.g., using RTP) illustrated by line 102 may be directly connected between the calling party (e.g. IP UE 121) on the registering SBC 143 in the access office 114 and the MGW 145 serving the called party (e.g. the TDM endpoint 122). In other words, the media path 102 is "directly connected" because the media path 102 by-passes the registering SBC 144 in the server office 115. As a result, "hairpinning" of the media path 102 is prevented and valuable network resources are conserved.

It should be noted that although the above examples are provided in a direction from the IP UE 121 to the TDM end point 122, the present disclosure also applies in a direction from the TDM end point 122 to the IP UE 121. In other words, the present disclosure also applies to calls originating from the PSTN 113.

Figure 2:
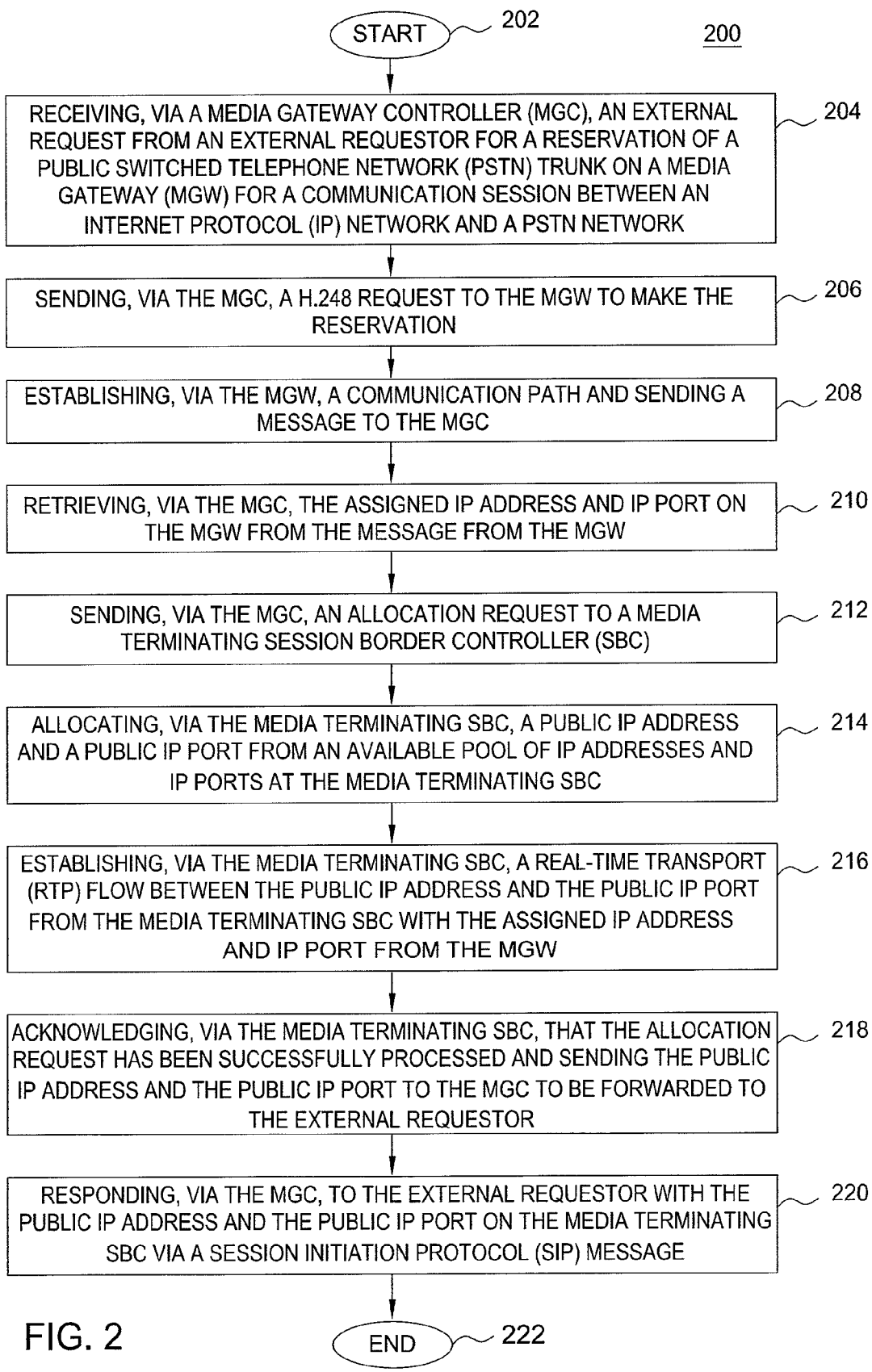
FIG. 2 illustrates a flowchart of a method for routing packets across disparate networks.

FIG. 2 illustrates a flowchart of a method 200 for efficiently routing packets across disparate networks. The reader is encouraged to refer back to FIG. 1 simultaneously while reading the steps of method 200. In one embodiment, one or more steps of the method 200 may be implemented by one of the MGC 148, the media terminating SBC 143, the MGW 145 or a general purpose computer having a processor, a memory and input/output devices as illustrated below in FIG. 3. The disparate networks may be a public network (e.g. the public network 111) and a private network (e.g., the internal network 112). For example the public network may be an untrusted network such as the Internet and the private network may be a trusted network such as a MPLS VPN connection.

The method 200 begins at step 202. At step 204, the method 200 receives, via an MGC, an external request from an external requestor for a reservation of a PSTN trunk on a MGW for a communication session between an IP network and a PSTN network. For example, the external request may be initiated by either the IP UE 121 on the IP network 104 or the TDM endpoint 122 on the PSTN 113.

At step 206, the method 200 sends, via the MGC, a H.248 request to the MGW to make the reservation. As discussed above the application server 150 may help the MGC identify the proper MGW associated with a called number. In another example embodiment, MGC can be configured with some translation rules that help the MGC to identify the proper MGW.

At step 208, the method 200 establishes, via the MGW, a communication path and sends a message to the MGC. For example, with reference to the example illustrated in FIG. 1, the MGW 145 may assign a port and an IP address on MGW's IP interface and a DS0 trunk from an appropriate trunk group. The MGW may further establish an internal flow between the IP address and port and the DS0 trunk to allow the media stream to flow through between IP interface and the TDM interface. Typically the port and the IP address are private ports and private IP addresses that can only be routed within the internal network. The port and the IP address are contained in the message sent back to the MGC.

At step 210, the method 200 retrieves, via the MGC, the assigned IP address and IP port on the MGW from the message from the MGW. At step 212, the method 200 sends, via the MGC, an allocation request to a media terminating SBC. At step 214, the method 200 allocates, via the media terminating SBC, a public IP address and a public IP port from an available pool of IP addresses and IP ports at the media terminating SBC.

For example, the media terminating SBC 143 re-allocate new IP port and a new IP address that are on the public interface.

At step 216, the method 200 establishes, via the media terminating SBC, a real-time transport protocol (RTP) flow path between the public IP address and port from the media terminating SBC with the assigned IP address and IP port from the MGW. As such, the media stream from an VoIP user endpoint device on the public network will be able to flow through the allocated IP address and port on the public interface of the terminating SBC, to the private IP address and port on the private IP interface of MGW, to the allocate DS0 trunk on the TDM interface of the MGW, to the PSTN network, to the PSTN phone. The reverse flow is also established. At step 218, the method 200 acknowledges, via the media terminating SBC, that the allocation request has been successfully processed and sends the public IP address and the public IP port to the MGC to be forwarded to the external requestor. Depending on the call types, it may be done in a SIP response message to an SIP INVITE request from a Breakout Gateway Control Function (BGCF), or may be done in a SIP INVITE message from MGC to an Interrogating-Call Session Control Function (I-CSCF). Both BGCF and I-CSCF are defined by 3GPP Internet Multimedia Subsystem Standard (IMS).

At step 220, the method 200 responds, via the MGC, to the external requestor with the public IP address and the public IP port on the media terminating SBC via a session initiation protocol (SIP) message. More specifically a media path traverses the public IP address and a public port of the media terminating SBC. As noted above with reference to the example illustrated in FIG. 1, the calling party end point 121 may be attempting to place an IP telephony call (e.g. VoIP) to the TDM endpoint 122. The modified call signal that is transmitted to the calling party end point 121, allows the calling party end point 121 to directly connect to the media terminating SBC 143 via the public network 111.

As a result, a media path is connected directly between the calling party and the called party using the public IP port and the public IP address re-allocated or re-assigned by the media terminating SBC 143. In other words, directly connected means that the registering SBC 144 and the trusted network (e.g. the internal network 112) between the registering SBC and the terminating SBC are by-passed. That is, the registering SBC 144 is not required to maintain a media path between the calling party and the MGW 145. In addition, the media path only needs to traverse the untrusted network (e.g., the public network 111) using the public IP port and a public IP address re-allocated or re-assigned by the media terminating SBC 143 to the MGW.

As a result, no "hairpinning" of the call results because the media path travels directly from the calling party to the media terminating SBC 143 and MGW 145 that serve the called party endpoint 122. This conserves resources, such as bandwidth, processing power and memory of network elements within the network 100. The method ends at step 222.

Although the method provided as an example above is discussed in terms of specific hardware devices such as an MGC and an MGW, it should be noted that other types of controllers and processors may be used without departing from the scope of the present invention. For example, a media resource function controller (MRFC) and a media resource function processor (MRFP) may be used instead of the MGC and the MGW. In another example, the MGC may be substituted with a registering SBC depending on the call scenario.

It should be noted that although not explicitly specified, one or more steps of the methods described herein may include a storing, displaying and/or outputting step as required for a particular application. In other words, any data, records, fields, and/or intermediate results discussed in the methods can be stored, displayed, and/or outputted to another device as required for a particular application.

Figure 3:
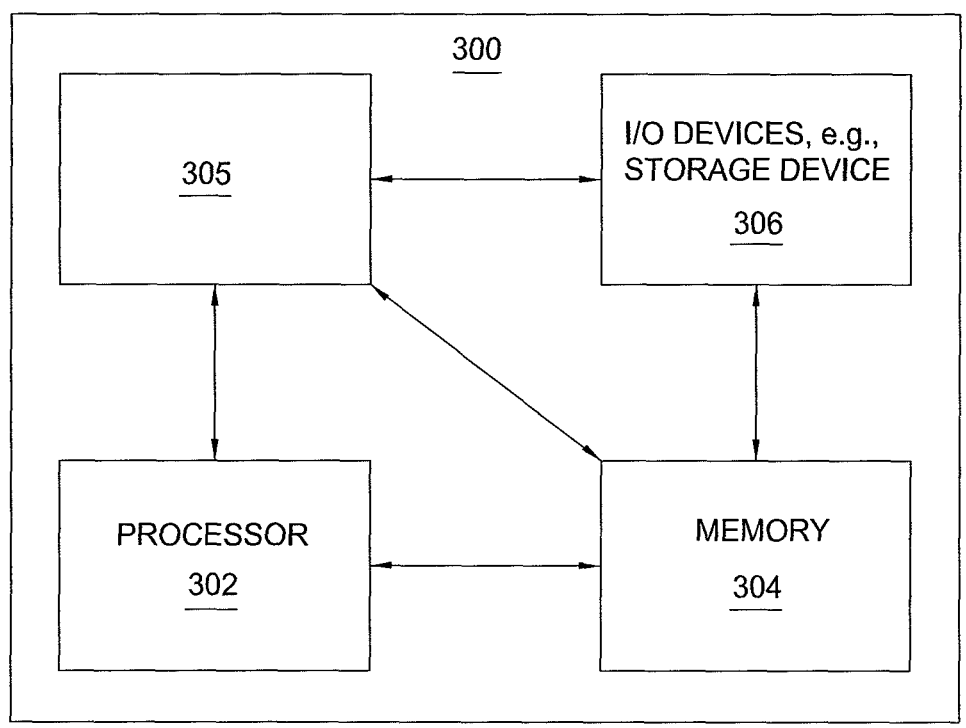
FIG. 3 illustrates a high-level block diagram of a general-purpose computer suitable for use in performing the functions described herein.

FIG. 3 depicts a high-level block diagram of a general-purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for routing packets across disparate networks, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 305 for routing packets across disparate networks can be loaded into memory 304 and executed by processor 302 to implement the functions as discussed above. As such, the present method 305 for routing packets across disparate networks (including associated data structures) of the present disclosure can be stored on a computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for routing packets across disparate networks, comprising:
   receiving, via a media gateway controller, an external request from an external requestor for a reservation of a public switched telephone network trunk on a media gateway for a communication session between a voice over internet protocol network and a public switched telephone network;
   sending, via the media gateway controller, a H.248 request to the media gateway to make the reservation;
   retrieving, via the media gateway controller, an assigned internet protocol address and an internet protocol port on the media gateway from a message received from the media gateway indicating a communication path has been established; and
   sending, via the media gateway controller, an allocation request to a media terminating session border controller for allocating a public internet protocol address and a public internet protocol port from an available pool of internet protocol addresses and internet protocol ports at the media terminating session border controller, wherein the media terminating session border controller is for establishing a real-time transport protocol flow between the public internet protocol address and the public internet protocol port from the media terminating session border controller with the assigned internet protocol address and internet protocol port from the media gateway.

2. The method of claim 1, further comprising:
   acknowledging, via the media terminating session border controller, that the allocation request has been successfully processed.

3. The method of claim 2, further comprising:
   sending, via the media terminating session border controller, the public internet protocol address and the public internet protocol port to the media gateway controller to be forwarded to the external requestor.

4. The method of claim 3, further comprising:
   responding, via the media gateway controller, to the external requestor with message containing the public internet protocol address and the public internet protocol port on the media terminating session border controller.

5. The method of claim 4, wherein the message is a session initiation protocol message.

6. The method of claim 1, wherein the communication session comprises by-passing a registering session border controller.

7. The method of claim 6, wherein a media path of the communication session only traverses an untrusted network.

8. The method of claim 1, wherein the external requestor is a calling party.

9. An apparatus for routing packets across disparate networks, comprising:
   a media gateway controller for receiving an external request from an external requestor for a reservation of a public switched telephone network trunk on a media gateway for a communication session between a voice over internet protocol network and a public switched telephone network, sending a H.248 request to the media gateway to make the reservation, retrieving an assigned internet protocol address and an internet protocol port on the media gateway from a message received from the media gateway indicating a communication path has been established, and sending an allocation request to a media terminating session border controller for allocating a public internet protocol address and a public internet protocol port from an available pool of internet protocol addresses and internet protocol ports at the media terminating session border controller, wherein the media terminating session border controller is for establishing a real-time transport protocol flow between the public internet protocol address and the public internet protocol port from the media terminating session border controller with the assigned internet protocol address and internet protocol port from the media gateway.

10. The apparatus of claim 9, the media terminating session border controller further configured to acknowledge that the allocation request has been successfully processed.

11. The apparatus of claim 10, the media terminating session border controller further configured to send the public internet protocol address and the public internet protocol port to the media gateway controller to be forwarded to the external requestor.

12. The apparatus of claim 11, the media gateway controller further configured to respond to the external requestor with message containing the public internet protocol address and the public internet protocol port on the media terminating session border controller.

13. The apparatus of claim 12, wherein the message is a session initiation protocol message.

14. The apparatus of claim 9, wherein the communication session comprises by-passing a registering session border controller.

15. The apparatus of claim 14, wherein a media path of the communication session only traverses an untrusted network.

16. The apparatus of claim 9, wherein the external requestor is a calling party.

17. A non-transitory computer-readable medium storing a plurality of instructions which, when executed by a processor of a media gateway controller, cause the processor to perform operations for routing packets across disparate networks, the operations comprising:

receiving an external request from an external requestor for a reservation of a public switched telephone network trunk on a media gateway for a communication session between a voice over Internet protocol network and a public switched telephone network;

sending a H.248 request to the media gateway to make the reservation;

retrieving an assigned internet protocol address and an internet protocol port on the media gateway from a message received from the media gateway indicating a communication path has been established; and sending an allocation request to a media terminating session border controller for allocating a public internet protocol address and a public internet protocol port from an available pool of internet protocol addresses and internet protocol ports at the media terminating session border controller, wherein the media terminating session border controller is for establishing a real-time transport protocol flow between the public internet protocol address and the public internet protocol port from the media terminating session border controller with the assigned internet protocol address and internet protocol port from the media gateway.

18. The non-transitory computer readable medium of claim 17, further comprising:

acknowledging that the allocation request has been successfully processed.

19. The non-transitory computer readable medium of claim 18, further comprising:

sending the public internet protocol address and the public internet protocol port to the media gateway controller to be forwarded to the external requestor.

20. The non-transitory computer readable medium of claim 19, further comprising:

responding to the external requestor with message containing the public internet protocol address and the public internet protocol port on the media terminating session border controller, wherein the message is a session initiation protocol message.

\* \* \* \* \*